United States Patent
McJunkin

(10) Patent No.: US 9,504,322 B1
(45) Date of Patent: Nov. 29, 2016

(54) STORAGE RACK WITH GAS-POWERED STRUT

(71) Applicant: James McJunkin, Bonita, CA (US)

(72) Inventor: James McJunkin, Bonita, CA (US)

(73) Assignee: OBEX, San Marcos, CA (US)

( * ) Notice: Subject to any disclaimer, the term of this patent is extended or adjusted under 35 U.S.C. 154(b) by 0 days.

(21) Appl. No.: 15/047,957

(22) Filed: Feb. 19, 2016

Related U.S. Application Data

(60) Provisional application No. 62/234,519, filed on Sep. 29, 2015.

(51) Int. Cl.
*A47B 7/00* (2006.01)
*A47B 81/00* (2006.01)
*B62H 3/12* (2006.01)

(52) U.S. Cl.
CPC ............... *A47B 81/00* (2013.01); *B62H 3/12* (2013.01)

(58) Field of Classification Search
CPC ........................................ B62H 3/12
USPC .................................... 211/17, 18
See application file for complete search history.

(56) References Cited

U.S. PATENT DOCUMENTS

| | | | | |
|---|---|---|---|---|
| 610,656 | A * | 9/1898 | Martin | B62H 3/12 211/104 |
| 3,057,491 | A * | 10/1962 | Schlensker | B60P 1/4414 414/557 |
| 3,976,200 | A * | 8/1976 | Munns | B62H 3/12 211/100 |
| 4,343,404 | A * | 8/1982 | Folsom | B25H 1/0007 211/17 |
| 4,400,129 | A * | 8/1983 | Eisenberg | A61G 3/0209 224/505 |
| 4,618,140 | A * | 10/1986 | Brown | A63B 22/0076 482/112 |
| 4,749,089 | A * | 6/1988 | Stewart, III | B62H 3/12 211/18 |
| 5,092,503 | A | 3/1992 | Cocks | |
| 5,209,628 | A * | 5/1993 | Hassell | B60P 1/4442 224/282 |
| 5,224,677 | A * | 7/1993 | Close | A47F 5/0087 211/104 |
| 5,529,231 | A * | 6/1996 | Burgess | B60R 9/10 224/282 |
| 5,553,718 | A * | 9/1996 | Robar | B62H 3/00 211/18 |
| 5,642,820 | A * | 7/1997 | Angeles | B62H 3/12 211/103 |

(Continued)

FOREIGN PATENT DOCUMENTS

| | | |
|---|---|---|
| EP | 1980475 B1 | 10/2008 |
| WO | 2014042260 A1 | 3/2014 |

OTHER PUBLICATIONS

"Flat-bike-lift—The new overhead rack to store the bikes flat to the garage ceiling", Amazon, http://www.amazon.com/flat-bike-lift-overhead-store-garage-ceilingidp/..., Jun. 10, 2015 (2 pages).

(Continued)

*Primary Examiner* — Joshua Rodden
*Assistant Examiner* — Kimberley S Wright
(74) *Attorney, Agent, or Firm* — Manuel de la Cerra

(57) ABSTRACT

A storage rack with a spring device has a bracket constructed to be fixed to a vertical surface, and a frame oriented substantially parallel to the vertical surface which is pivotably connected to the bracket. The bracket and the frame have one or more attachment locations for pivotably connecting to opposite ends of the spring device. The frame has at least one mounting location for releasably attaching at least one object support. The spring device is constructed to generate a lift force to deploy the frame and an object supported by the at least one object support to a substantially horizontal storage position. The lift force may be tuned by adjusting the connection of the spring device between the pivotable connections with the bracket or the frame.

19 Claims, 17 Drawing Sheets

(56) References Cited

U.S. PATENT DOCUMENTS

| | | | | |
|---|---|---|---|---|
| 5,647,521 A * | 7/1997 | Burgess | ............... | B60R 9/10 224/505 |
| 5,662,256 A * | 9/1997 | Bryan | ............... | B60R 9/06 211/18 |
| 5,664,687 A * | 9/1997 | Liatti | ............... | B62H 3/12 211/118 |
| 5,730,345 A * | 3/1998 | Yeckley | ............... | B60R 9/10 224/505 |
| 5,941,397 A | 8/1999 | Buchanan et al. | | |
| 6,082,552 A * | 7/2000 | Pollock | ............... | B62H 3/12 211/104 |
| 6,095,344 A * | 8/2000 | White | ............... | B62H 3/12 211/117 |
| 6,269,958 B1 * | 8/2001 | Pollock | ............... | B62H 3/12 211/104 |
| 6,302,278 B1 * | 10/2001 | Dueck | ............... | A47F 7/00 211/104 |
| 6,648,148 B1 * | 11/2003 | Bally | ............... | B62H 3/12 211/104 |
| 6,691,878 B1 * | 2/2004 | Ouitz | ............... | A47B 97/00 211/103 |
| 7,108,140 B2 * | 9/2006 | Whitnall | ............... | B60R 9/10 211/195 |
| 7,168,575 B2 * | 1/2007 | Olsen, Jr. | ............... | B60R 5/00 211/17 |
| 7,225,933 B1 * | 6/2007 | Pollock | ............... | B62H 3/12 211/118 |
| 7,854,331 B2 * | 12/2010 | Ouyang | ............... | B62H 3/12 211/18 |
| 8,985,344 B2 * | 3/2015 | Larson | ............... | B62H 3/12 211/1.51 |
| 2007/0007316 A1 | 1/2007 | Witczak | | |
| 2009/0178984 A1 * | 7/2009 | Ouyang | ............... | B62H 3/12 211/18 |
| 2010/0237027 A1 * | 9/2010 | Shaha | ............... | B62H 3/12 211/17 |
| 2012/0043286 A1 * | 2/2012 | Noyes | ............... | B62H 3/12 211/22 |
| 2012/0312760 A1 * | 12/2012 | Larson | ............... | B62H 3/12 211/1.51 |
| 2014/0308101 A1 | 10/2014 | Brutsaert | | |

OTHER PUBLICATIONS

"BDS Two Tier Bike Rack—With Gas Strut" (2 pages).

* cited by examiner

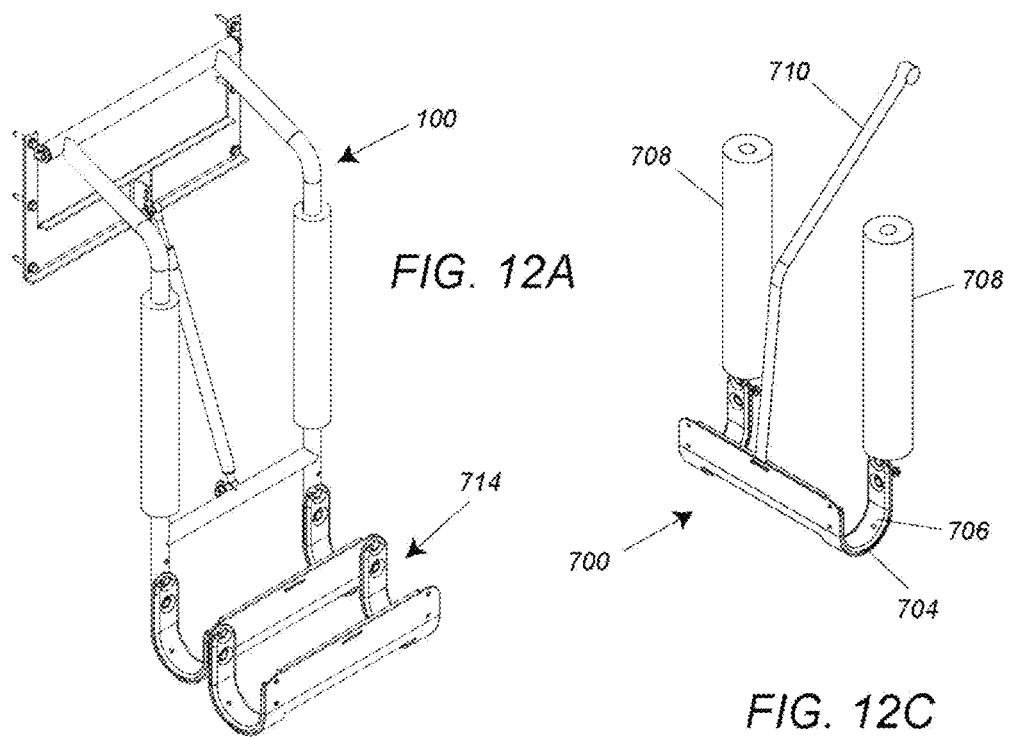
FIG. 12A
FIG. 12C
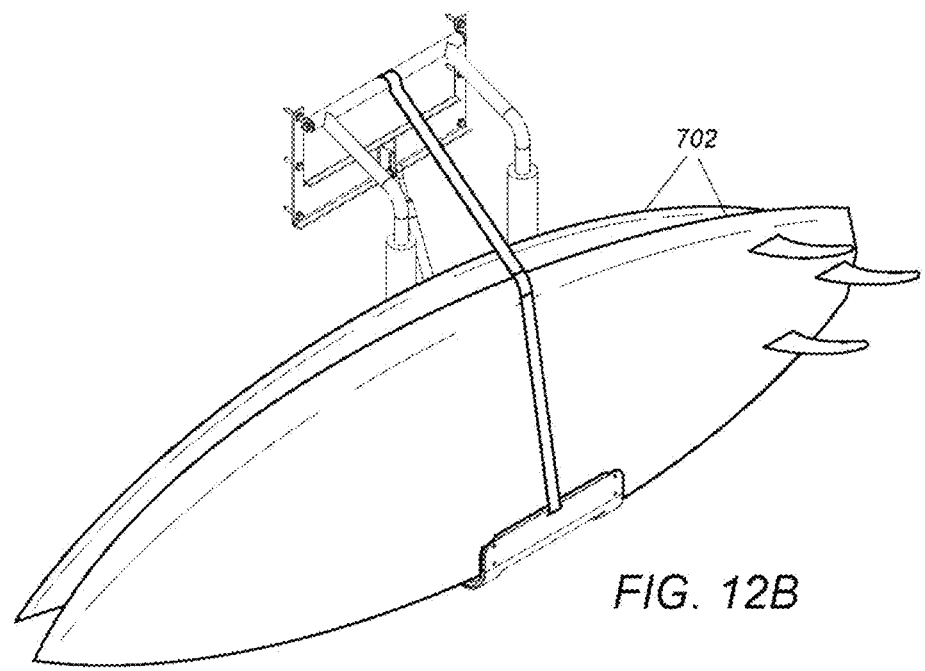
FIG. 12B

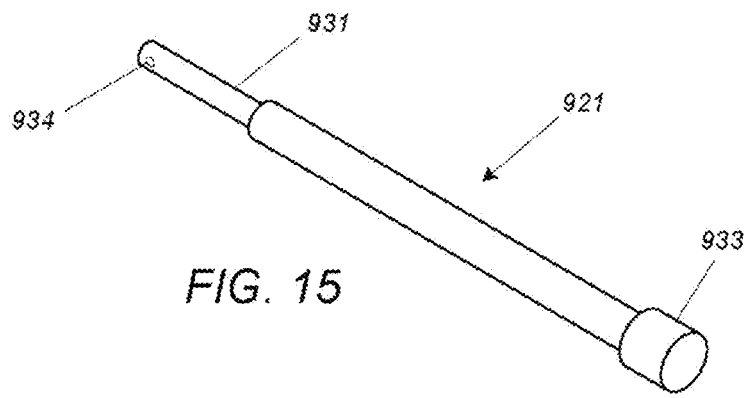
FIG. 15
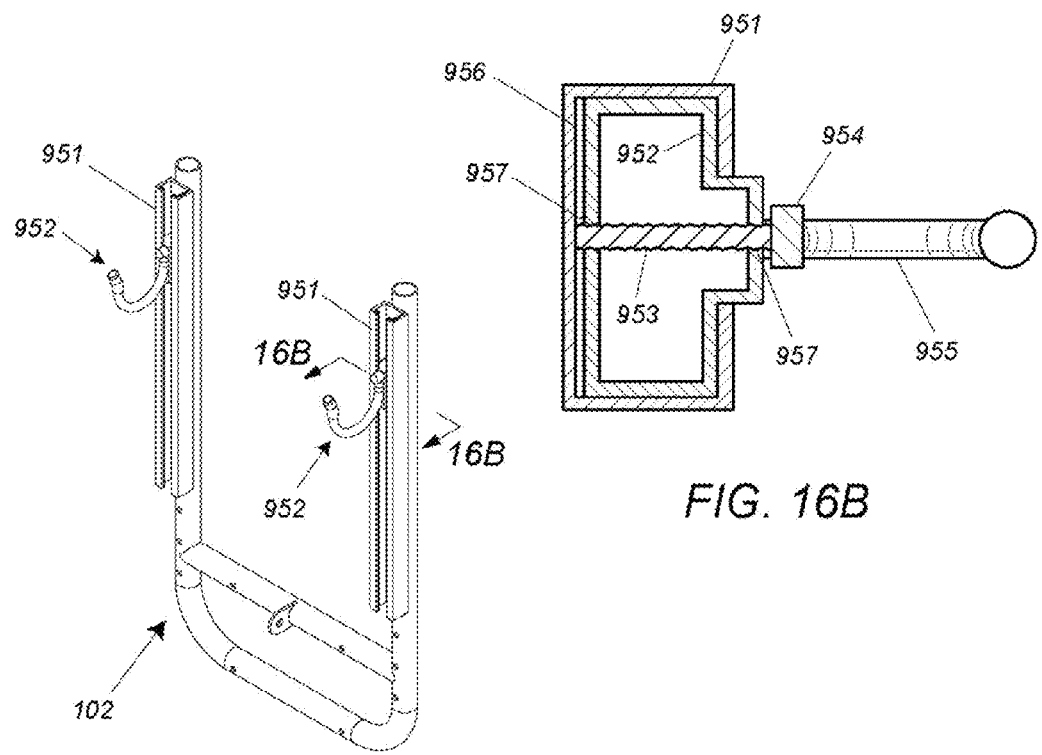
FIG. 16B
FIG. 16A

STORAGE RACK WITH GAS-POWERED STRUT

1.0 TECHNICAL FIELD

The present invention relates generally to storage devices, and more particularly, to a wall-mounted device for lifting and storing an object such as a bicycle or other sporting equipment.

2.0 BACKGROUND

Active sports are increasingly popular. Gear such as bicycles, surfboards, paddleboards and snowboards requires considerable space for storage. When sporting equipment is stored in a confined area with limited space such as a garage, it may interfere with other items in the area, such as cars. Often such storage areas offer unused space near the ceiling, but access to this wasted space is typically inconvenient or impractical. Lifting a heavy object such as a bicycle toward the ceiling is difficult for many people.

Know in the art are devices which attempt to resolve the problem of storing equipment for cycling or other sports. However, typical current devices are not compact or convenient, nor easy to install or use. Often they still require the strength of user to hoist the sports equipment out of the way.

Some storage devices include a powered assist, such as a gas spring or strut, to aid in lifting the sporting equipment. However, none of the prior art devices allow for the gas strut force to be adjusted by the user in order to tailor it for a specific bicycle weight and pull-down resistance. Also previous designs are ceiling mounted, which limits the location where the storage device may be installed, and prevents installation where the ceiling height places the storage device out of reach of the user.

Thus there is a need in the art for a convenient, wall-mounted bicycle rack and tunable power-assisted overhead bicycle storage lift.

3.0 SUMMARY

A storage rack is disclosed that solves the problems found in the prior art. The rack includes a spring device such as a gas strut, and a bracket that mounts to a vertical surface. The bracket has at least one attachment location that provides a pivotable connection to the spring device. The rack also includes a frame oriented substantially parallel to the vertical surface and pivotably connected to the bracket with at least one attachment location for the spring device. The frame has at least one mounting location for releasably attaching an at least one object support, such as a hook. The bracket and/or the frame also includes at least one additional mounting location for the spring device. The spring device pivotably links the bracket and the frame and generates a lift force to deploy the frame and an object supported by the at least one object support to a substantially horizontal storage position. The lift force may be tuned by adjusting the connection of the spring device between the pivotable connections with the bracket or the frame.

In one aspect, the rack may have more than one mounting location for attachment of the object support. And that object support may be a hook or a saddle, and may include a strap or latch to secure the object to the frame. The rack may also have protective padding to protect the object from damage when it is mounted to the rack.

The rack may also have a retainer to secure the frame in an orientation substantially parallel to the vertical surface. It may also have a retainer bar mounted to the vertical surface below the bracket, and a retaining strap attached to the frame which releasably secures to the retainer bar.

Fine tuning of the lift force may be accomplished in a variety of ways. For example, the lift force may be decreased by connecting the spring device at a higher pivotable connection on the bracket or on the frame. The lift force may be decreased by adjusting the spring device to a lower pivotable connection on the bracket or on the frame. Additionally, the lift force may be increased by adjusting the at least one object support to a higher mounting location on the frame, or decreased by adjusting the at least one object support to a lower mounting location on the frame.

The rack may further include a channel attached to the frame and a slide assembly moveable along the channel, wherein the slide assembly retains the object support and is fixable at any position along the channel. To prevent over extension of the frame, the rack may further include a stop attached to the frame that limits deployment of the frame beyond the substantially horizontal storage position by contacting the vertical surface.

Also described is a method for storing an object using the disclosed structures.

The foregoing summary is illustrative only and is not meant to be exhaustive. Other aspects, objects, and advantages of this invention will be apparent to those of skill in the art upon reviewing the drawings, the disclosure, and the appended claims.

4.0 BRIEF DESCRIPTION OF THE DRAWINGS

Various aspects of certain example embodiments can be better understood with reference to the following figures. The components shown in the figures are not necessarily to scale, emphasis instead being placed on clearly illustrating example aspects and features. In the figures, like reference numerals designate corresponding parts throughout the different views and embodiments. Certain components and details may be omitted from the figures to improve clarity.

FIG. 12A is a perspective view of an embodiment of a storage rack with a double surfboard saddle.

FIG. 12B is a perspective view of the storage rack holding surfboards.

FIG. 12C is a perspective view of a single surfboard saddle.

FIG. 15 is a perspective view of an extension stop for the storage rack.

FIG. 16A is a perspective view of the frame which includes a channel.

FIG. 16B shows detail of the channel of FIG. 16A.

5.0 DETAILED DESCRIPTION OF EXAMPLE EMBODIMENTS

Following is a written description illustrating various aspects of non-limiting example embodiments. These examples are provided to enable a person of ordinary skill in the art to practice the full scope of the invention, including different examples, without having to engage in an undue amount of experimentation. As will be apparent to persons skilled in the art, further modifications and adaptations can be made without departing from the spirit and scope of the invention, which is limited only by the claims.

In the following description, numerous specific details are set forth in order to provide a thorough understanding. Particular example embodiments may be implemented without some or all of the disclosed features or specific details. Additionally, to improve clarity of the disclosure some components well known to persons of skill in the art are not described in detail.

The present invention provides a convenient, wall-mounted bicycle rack and tunable power-assisted overhead bicycle storage lift. The design uses gas-powered struts to effortlessly lift a bicycle to a safe overhead storage position, for example in a garage. The storage rack reduces potential damage to the bicycle or a nearby automobile by using unoccupied free space up and away from ground-level hazards. Additionally, the storage rack helps to minimize potential accidents and injuries which may occur when physically lifting bicycles overhead and onto typical ceiling-mounted hangers or bicycle racks. The storage rack does not only store bicycles but may be used for a variety of other items, such as standup paddleboards, surfboards, and snow sports equipment.

Figure 1A:
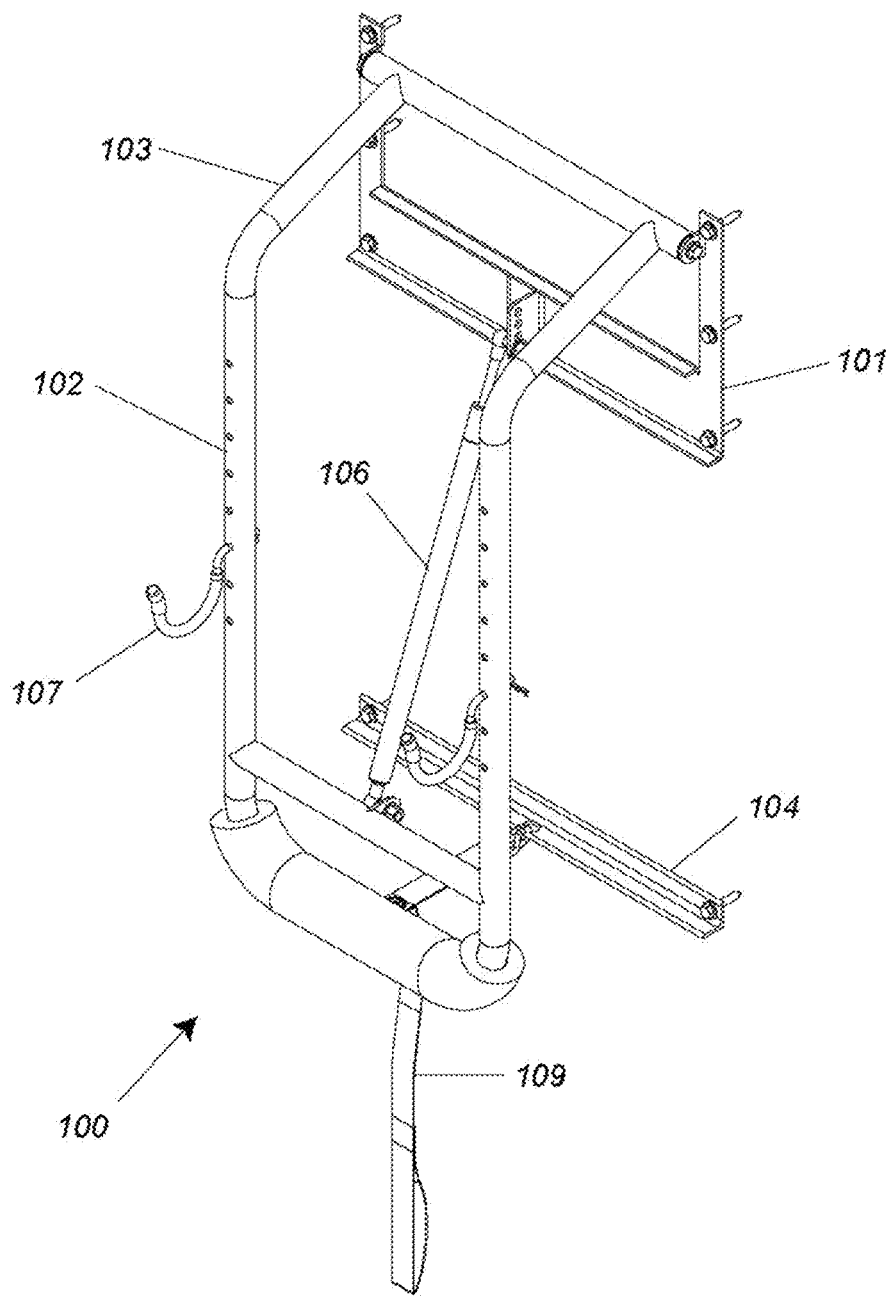
FIG. 1A is a perspective view of an embodiment of a storage rack with bicycle hooks, unloaded and in a stowed position.

In FIG. 1A, the storage rack 100 with gas-powered strut 106 is shown stowed in the loading position, ready to accept a bicycle (not shown). A wall bracket 101 may be attached to a vertical surface such as a wall of a garage or shed. Attached to the wall bracket 101 is a pivoting tube frame 103 which connects to an accessory tube frame 102. In the loading position, the accessory frame 102 is substantially in a vertical orientation, parallel to a wall, for example. The accessory frame 102 holds bicycle hooks 107 which are j-shaped to hold the frame of a bicycle. The gas strut 106 connects the accessory frame 102 to the wall bracket 101, and is fully compressed in the loading position. Also attached to the accessory frame 102 is a retainer/pull-down strap 109, which connects to a retainer bar 104 mounted to the vertical surface beneath the wall bracket 101. When secured to the retainer bar 104, the retainer/pull-down strap secures the pivoting frame 103 in the storage position.

Figure 1B:
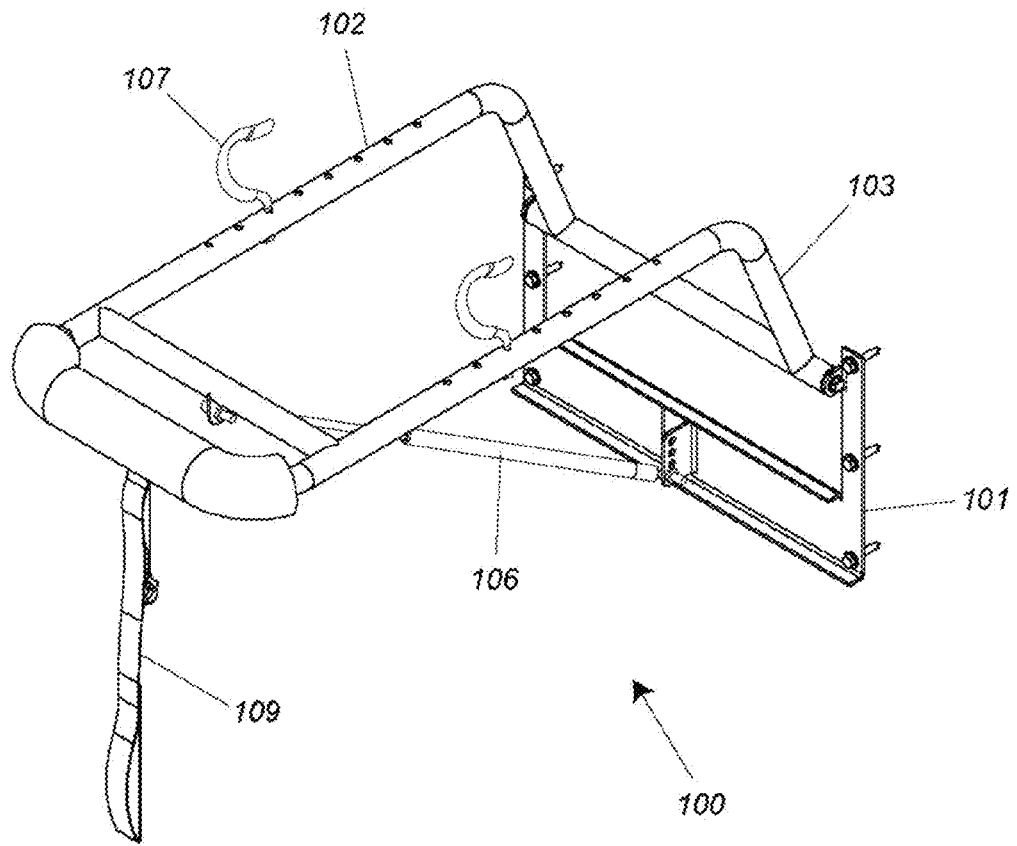
FIG. 1B is a perspective view of the unloaded storage rack in a deployed position.

FIG. 1B shows the storage rack 100 deployed into the storage position. The retainer/pull-down strap 109 is disconnected from the retainer bar 104 (not shown) and the gas strut 106 is fully extended such that the pivoting frame 103 has rotated. In the storage position, the accessory frame 102 is in a substantially horizontal orientation, parallel to a ceiling, for example. It should be noted that the wall mount of the storage rack, allows it to be installed flush to the wall, and along any height on the wall. This feature is important because ceiling mounted systems are not appropriate when the storage room has vaulted ceiling because it places the storage rack out of reach of the user.

Figure 2A:
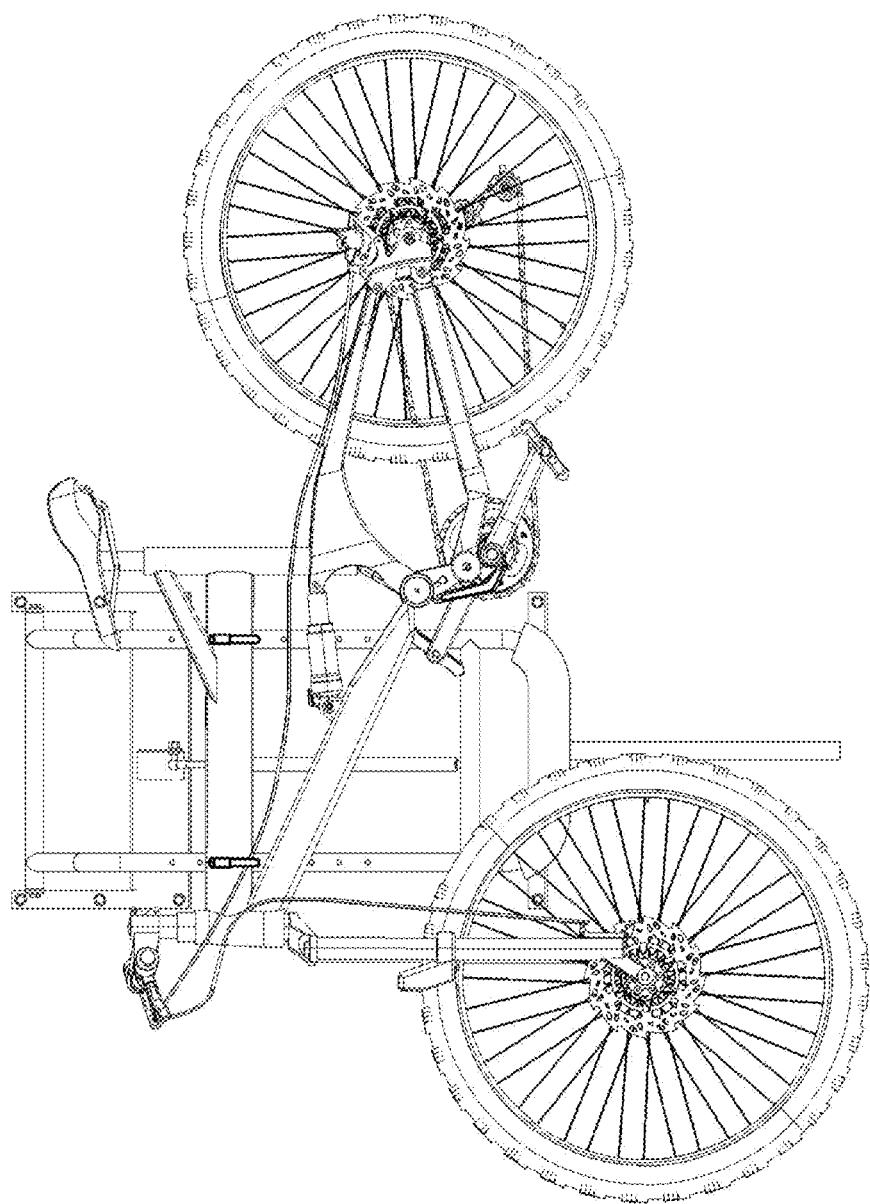
FIG. 2A is a front view of the storage rack in a stowed position, holding a bicycle.
Figure 2B:
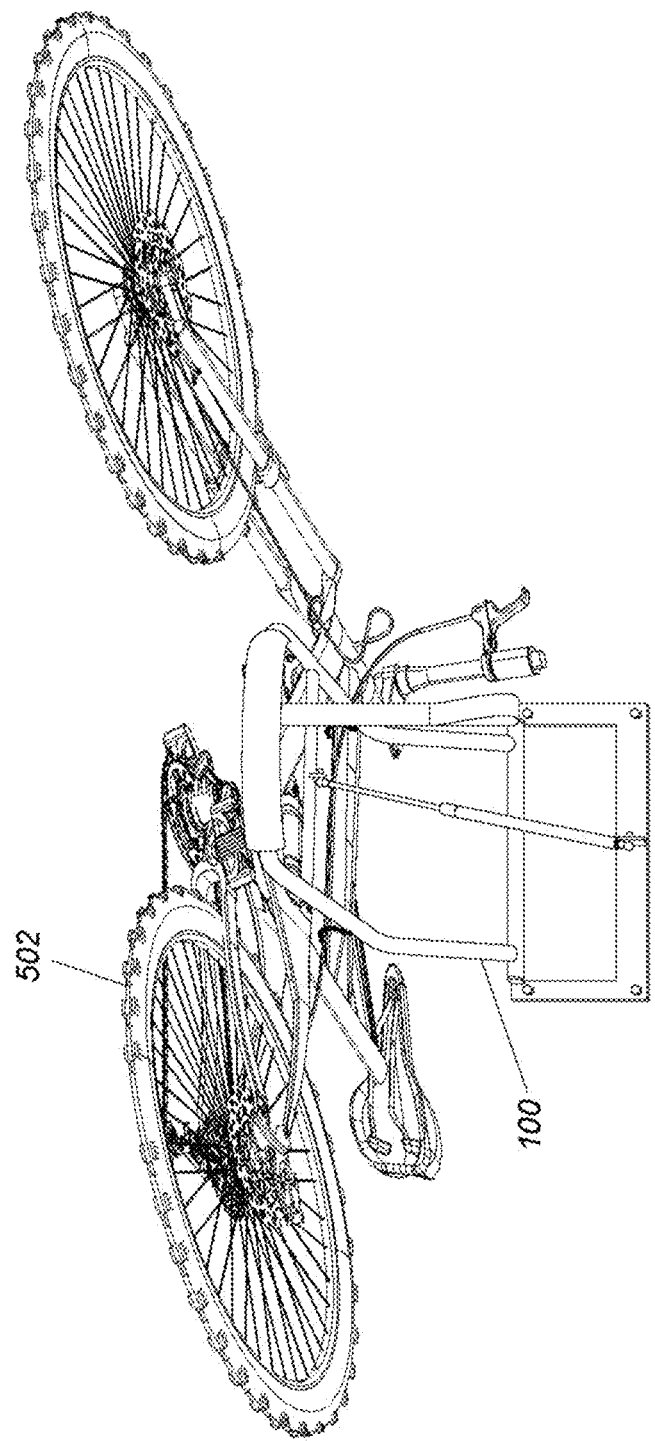
FIG. 2B is a perspective view of the storage rack in a deployed position, holding a bicycle.
Figure 3:
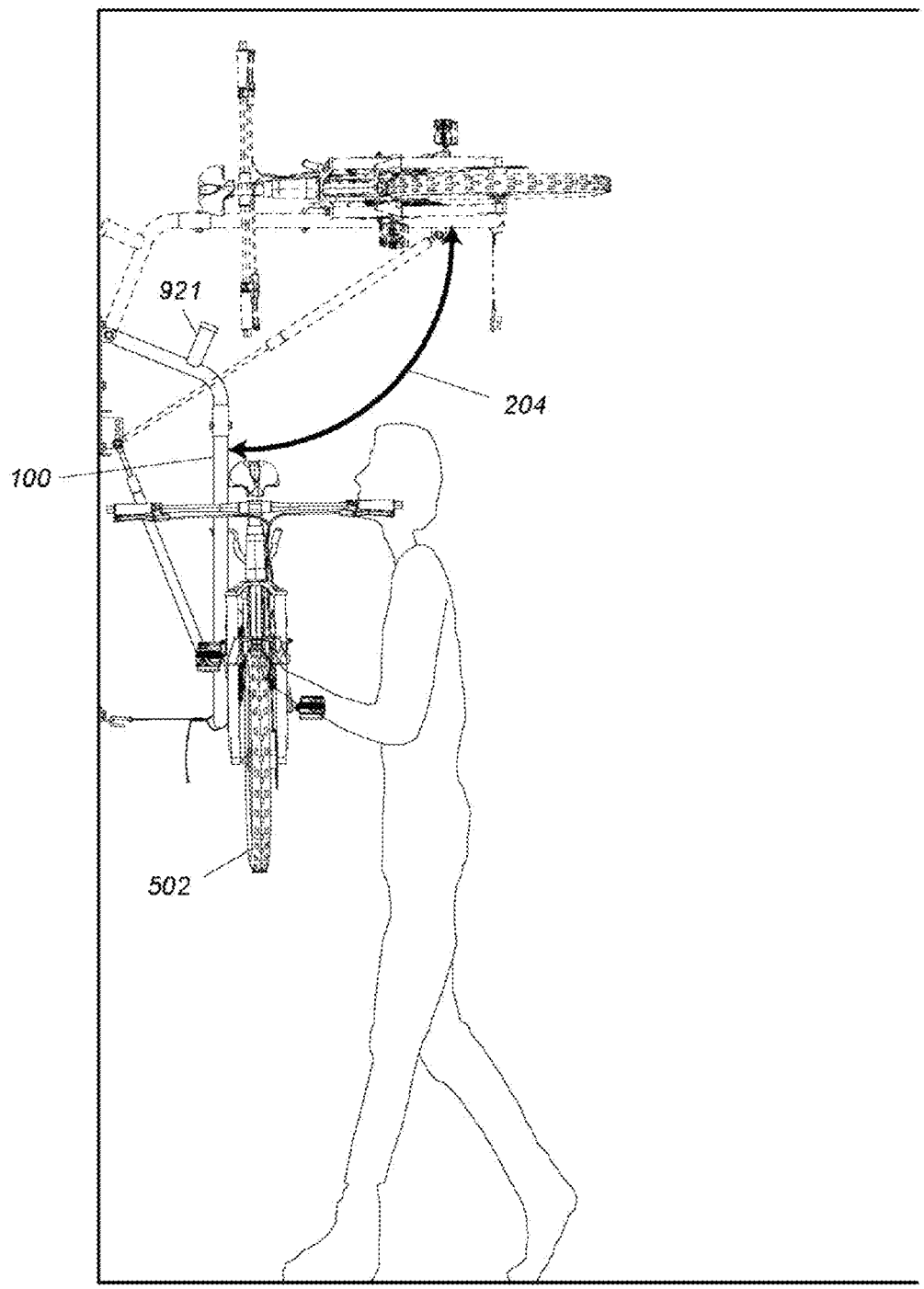
FIG. 3 is illustrates the operation of the loaded rack.

In FIGS. 2A and 2B, the storage rack 100 is shown holding a bicycle 502 in the loading position and in the storage position. FIG. 3 is a side view of the bicycle 502 on the rack 100 in both positions, with a user 202, and also shows a stop 921 that prevents overdeployment of the storage rack 100.

Figure 4:
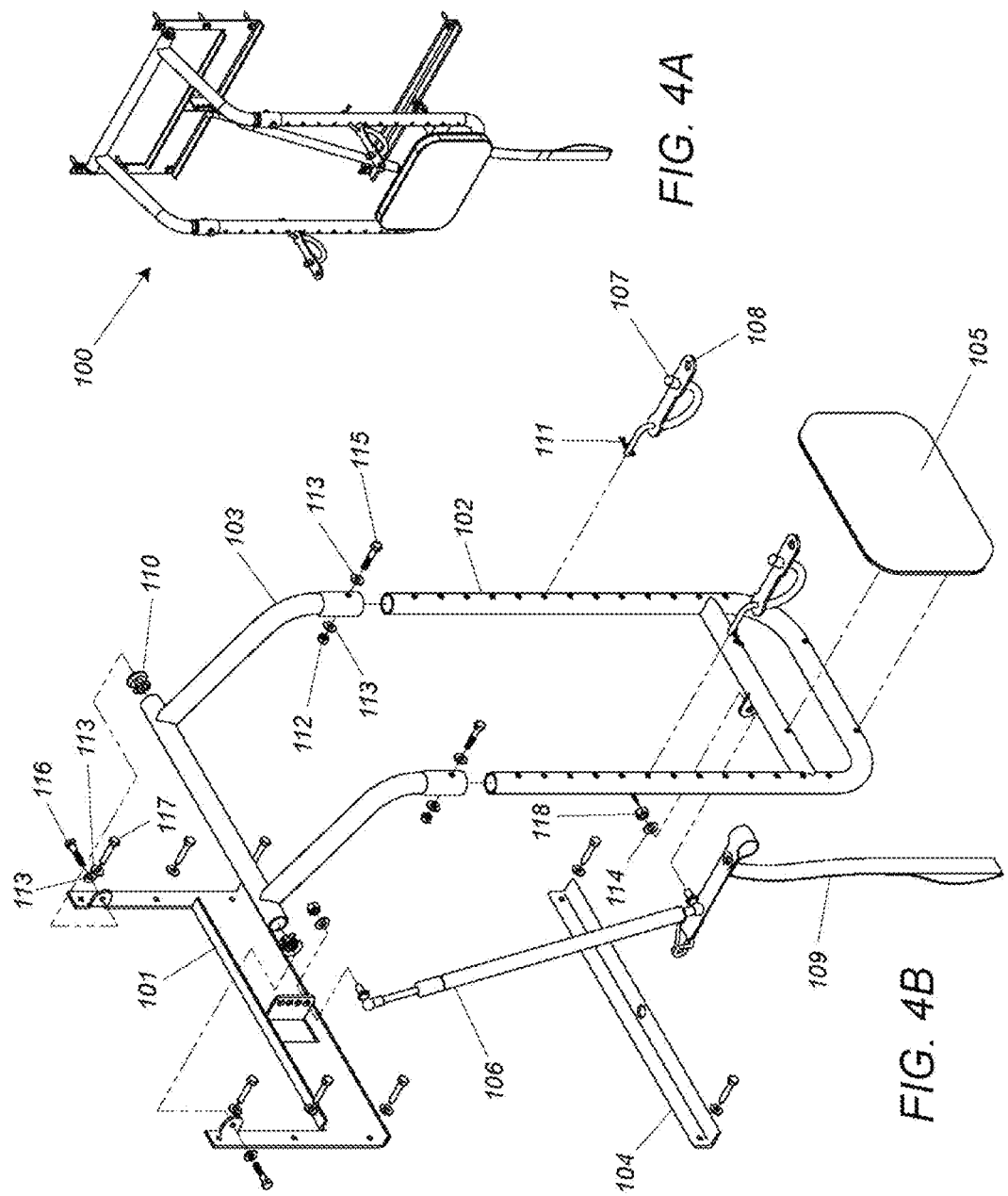
FIG. 4A is a perspective view of the unloaded storage rack in a stowed position.
FIG. 4B is an exploded perspective view of the unloaded storage rack in a stowed position.
Figure 8A:
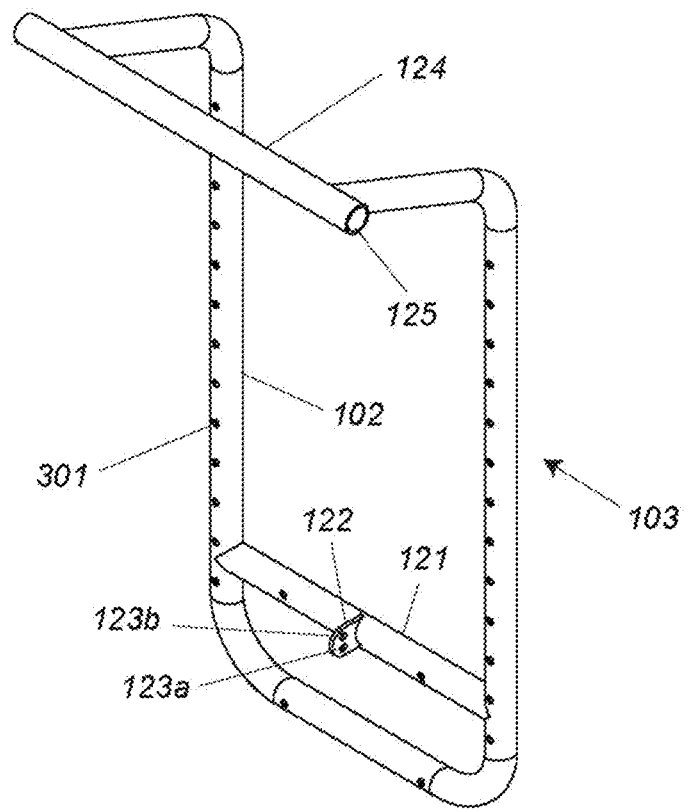
FIG. 8A is a perspective view of the frame of the storage rack.
Figure 8B:
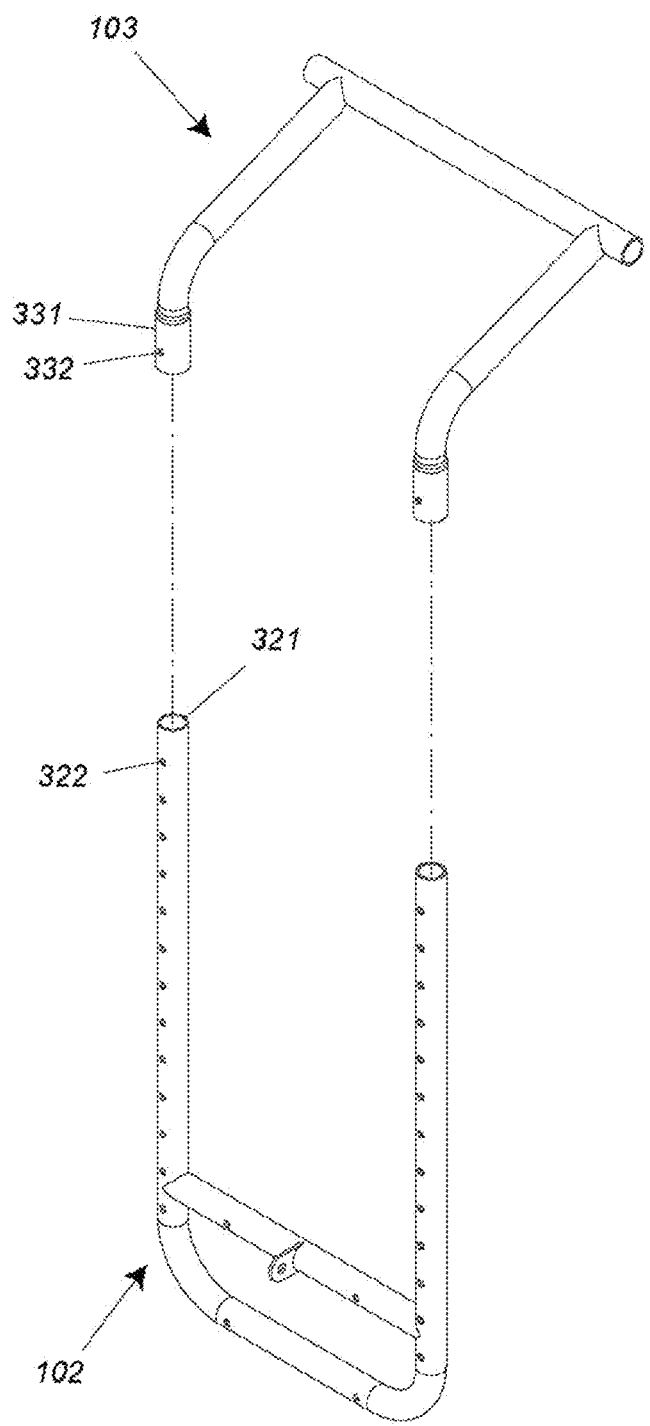
FIG. 8B is an exploded perspective view of the frame of the storage rack.

FIG. 4A illustrates the storage rack 100 in the loading position, and FIG. 4B provides an exploded view of this example embodiment. The hoop frame is comprised of an accessory frame 102 attached to a pivoting frame 103, as seen also in FIGS. 8A and 8B. The frame 102/103 may be a 1-inch outer diameter tube with a 0.083-inch wall, for example. In one embodiment, the frame 102/103 measures approximately 30 inches vertically while in the loading position, and the pivoting frame arms 334 are approximately 12 inches apart. The ends 331 of the pivoting frame 103 are expanded to create a slip fit over the ends 321 of the accessory frame 102, and the pivoting frame 103 and accessory frame 102 are connected together using bolts 115, such as hex-head bolts, through holes 332, 322, washers 113 and hex nuts 112. The pivoting frame 102 has an upper crossbar 124 which attaches to the wall bracket 101. Retaining clips 110 cap the ends 125 of the pivoting frame 102. The upper crossbar 124 fits between the tabs 215 in the wall bracket 101 and is secured to the wall bracket 101 using hex-head bolts 116 and washers 113 through holes 216 and clips 110.

Figure 5:
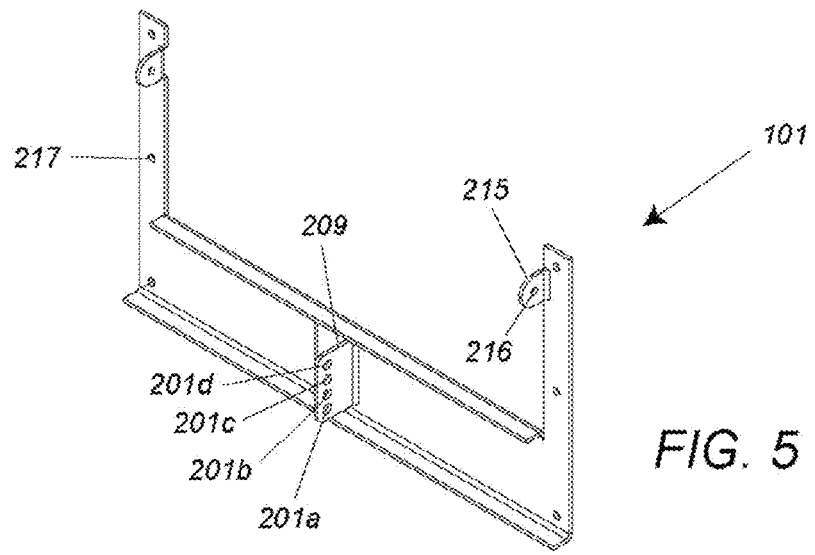
FIG. 5 is a perspective view of the wall bracket of the storage rack.
Figure 7:
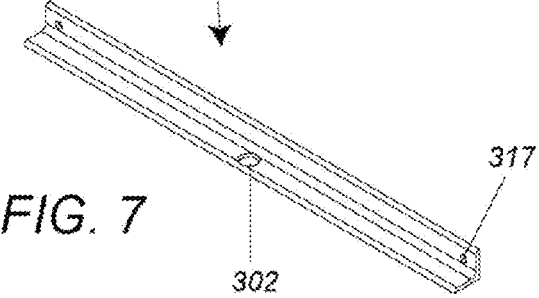
FIG. 7 is a perspective view of the retainer bar of the storage rack.

The top of the wall bracket 101 is located a distance above the floor that will make use of the wasted space near the ceiling while allowing adequate clearance when the storage rack 100 is deployed to the storage position with an item such as a bicycle. In a typical garage, this distance may place the frame crossbar 124 about seven feet above the floor. The wall bracket 101, shown in greater detail in FIG. 5, is secured to a wall or other sturdy vertical surface by several pairs of lag screws 117 which pass through washers 113 and bracket holes 217 and screw into the wall using pilot holes drilled in the center of a wall stud, for example. The lag screws 117 may be 0.25-inch lag screws. The retainer bar 104, shown also in FIG. 7, is secured similarly using lag screws with washers through retainer bar holes 317, and is located 57" above the floor in a typical garage.

Figure 6:
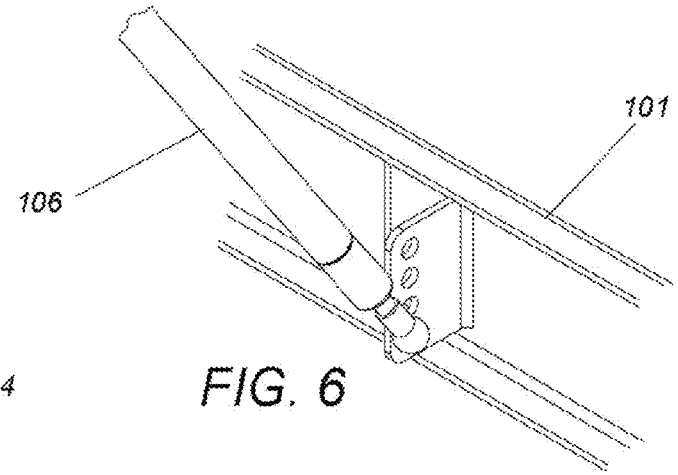
FIG. 6 illustrates positions for mounting the strut of the storage rack.
Figure 11:
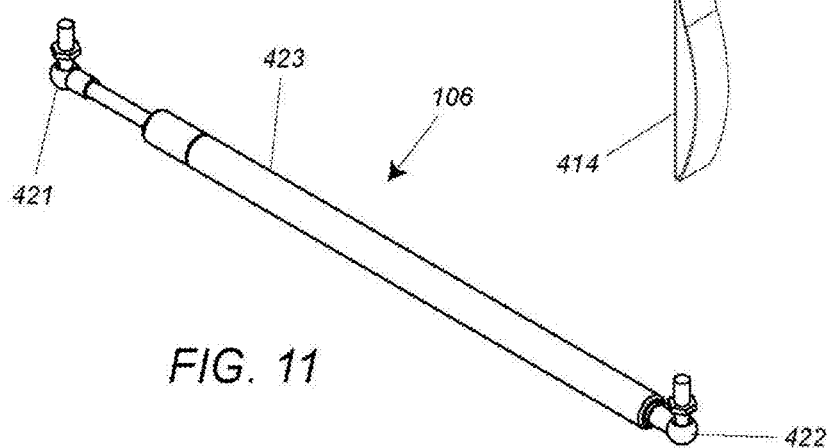
FIG. 11 is a perspective view of the gas strut of the storage rack.

The gas strut 106, shown in more detail in FIG. 11, attaches to the wall bracket and to the accessory frame. The gas strut 106 may be a gas spring 423 with a ball stud threaded end 422 that fits into a hole 123a, 123b in a frame tab 122 on lower crossbar 121, and is secured with a washer 114 and a lock nut 118. FIG. 6 shows a close-up view of this connection. The opposite, smaller end 421 connects into a wall bracket tab 209 via a hole 201a, 201b, 201c, 201d and is secured with another washer 114 and another lock nut 118.

Figure 10:
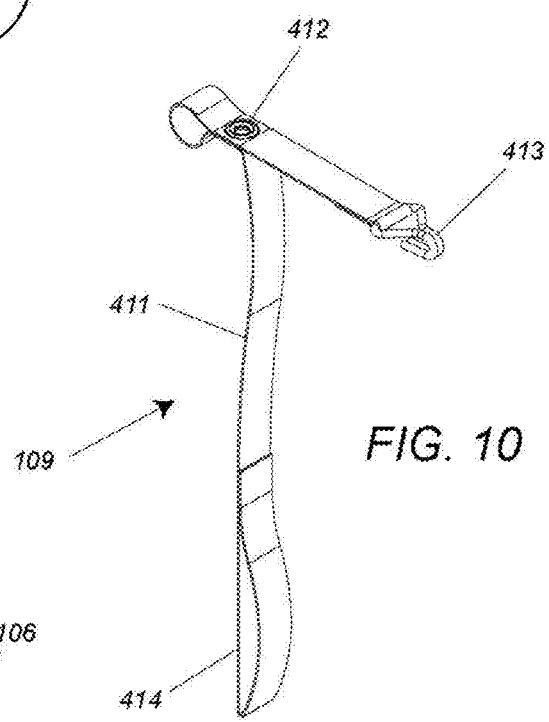
FIG. 10 is a perspective view of the retainer/pull-down strap of the storage rack.

A retaining strap 109, also illustrated in FIG. 10, wraps around the lowest portion of the accessory frame 102 and secures the frame 102/103 to the retainer bar 104 when the frame 102/103 is in the vertical loading position. A retaining clip, which may be a double-j wire hook, clips into a hole 302 in the retainer bar 104 to prevent unwanted deployment of the frame 102/103. The nylon strap 411 is secured around the frame 102 with a grommet 412, and features a pull-down loop 412 at its distal end.

Figure 9:
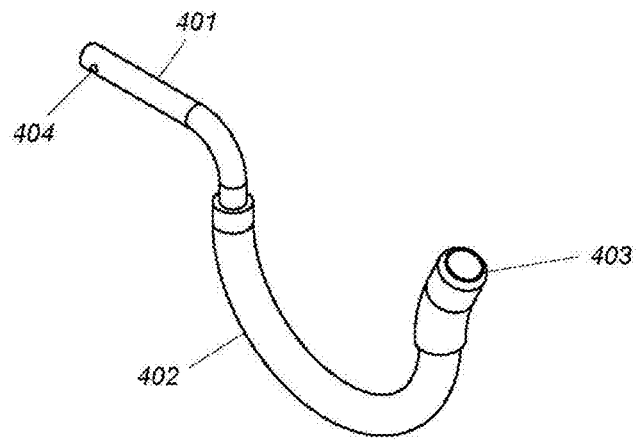
FIG. 9 is a perspective view of the bicycle hook of the storage rack.

The accessory frame 102 has a plurality of attachment mounting holes 302 which pass through the tubular frame along the side arms 324. In one embodiment, a pair of bicycle hooks 107, shown in FIG. 9, are supported. A wire hook 401 has protective vinyl tubing 402 in the curl of the "J" and is tipped with a flexible short cap 301. Each bicycle hook 107 is inserted through collinear holes 302 and is secured to the accessory frame 102 with a cotter pin 111 through a cotter pin hole 404 in the wire hook 401. The bicycle hook 107 may also include a rubber latch 108 constructed to wrap around the frame of a supported bicycle. The lower portion of the accessory frame 102 may also have a padded front plate 105 attached thereto to protect a supported bicycle from contact with the accessory frame 102.

Figure 12D:
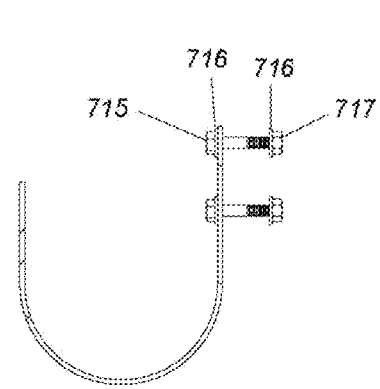
FIG. 12D is a side view of the single surfboard saddle.

FIG. 12A through 12C depict another embodiment which allows for surfboard storage. In FIG. 12A, a double surfboard saddle 714 is shown on to the storage rack 100, and FIG. 12B illustrates two surfboards 702 in the loading position on the storage rack 100. FIG. 12C provides detail of a surf accessory kit 700 which includes a single surfboard saddle 704 lined with a protective foam pad 706. Also to prevent damage, foam tubes 708 enclose the side arms 324 of the accessory frame 102 that would contact the surfboard. A strap 710, which may be elastic, loops around the pivoting frame upper crossbar 124 and connects to the surfboard saddle 704 via a clip or other attachment to secure the surfboard in place. FIG. 12D shows a side view of the single surfboard saddle 704 with attachment hardware. The saddle 704 mounts to the accessory frame 102 via holes 301 using hex bolts 715, washers 716 and hex nuts 717.

Figure 13B:
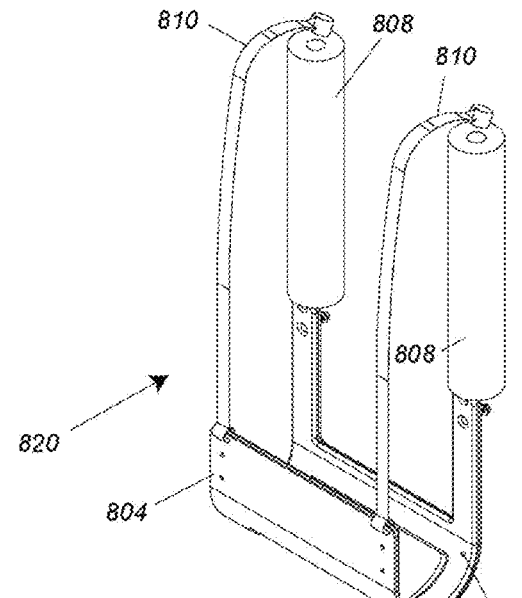
FIG. 13B is a perspective view of a stand-up paddleboard saddle.
Figure 13A:
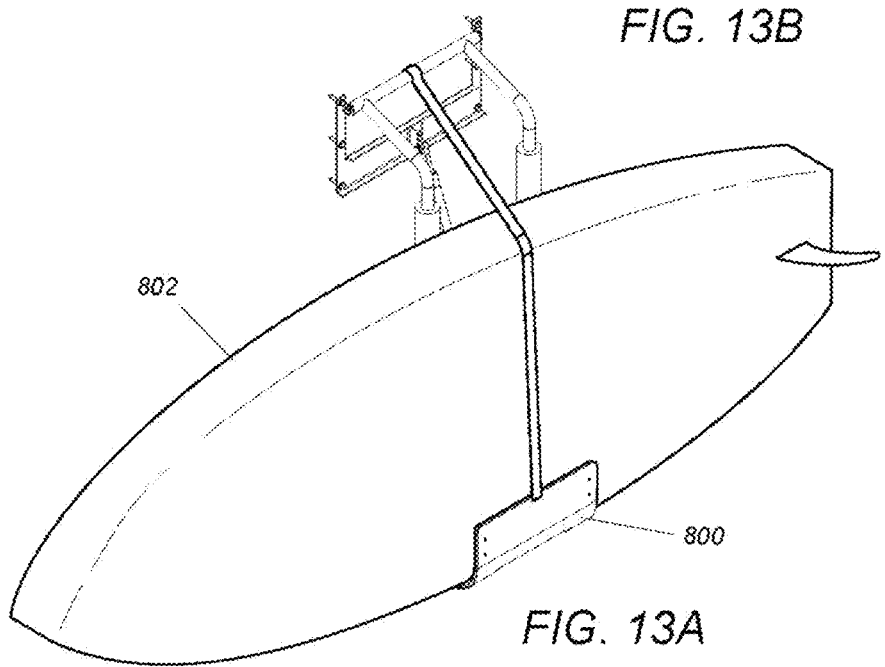
FIG. 13A illustrates an embodiment of a storage rack with a stand-up paddleboard saddle, holding a stand-up paddleboard, in stowed and deployed positions.

FIG. 13A shows another embodiment for storing a stand-up paddleboard (SUP) 802 using a SUP accessory kit 800. FIG. 13B illustrates the components of the SUP kit 800, which includes a SUP saddle 800 lined with a protective foam pad 806. As for the surf accessory kit, foam tubes 808 enclose the side arms 324 of the accessory frame 102 that would contact the SUP. FIG. 13B shows two straps 810 that may secure the SUP by attaching between the accessory frame and the SUP saddle; alternatively, one strap may be used as in FIG. 13A.

Figure 14B:
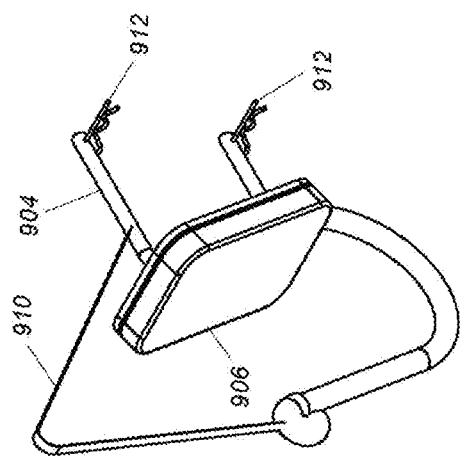
FIG. 14B is a perspective view of a snow accessory kit.
Figure 14C:
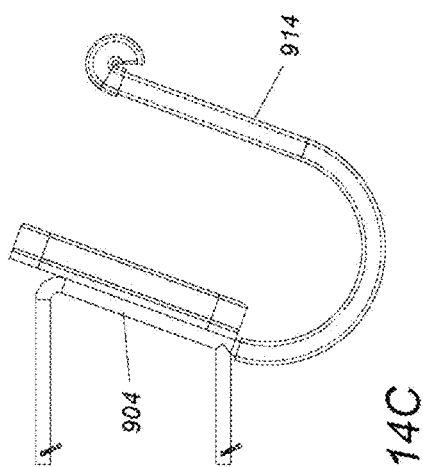
FIG. 14C is a side view of the snow accessory kit.
Figure 14A:
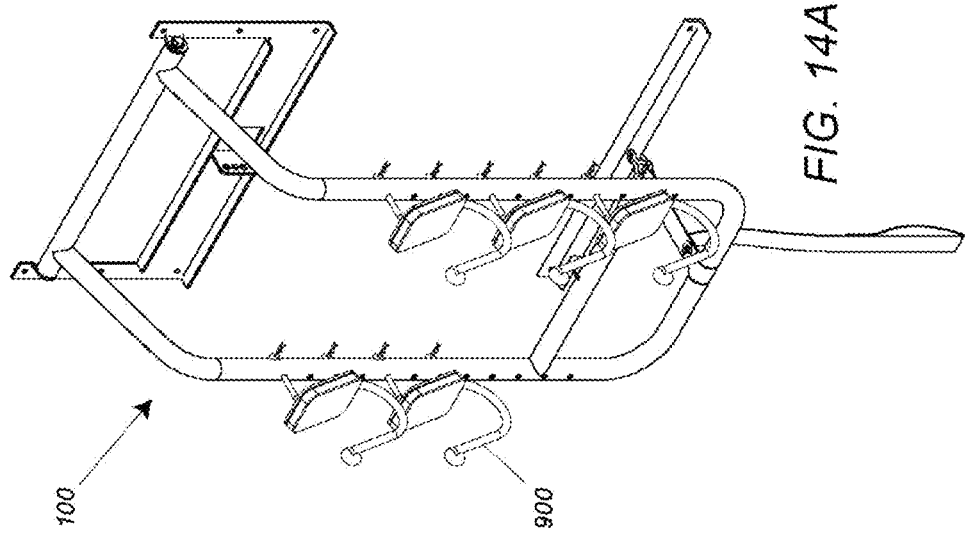
FIG. 14A is a perspective view of an embodiment of a storage rack with snow accessory kits in a stowed position.
Figure 14D:
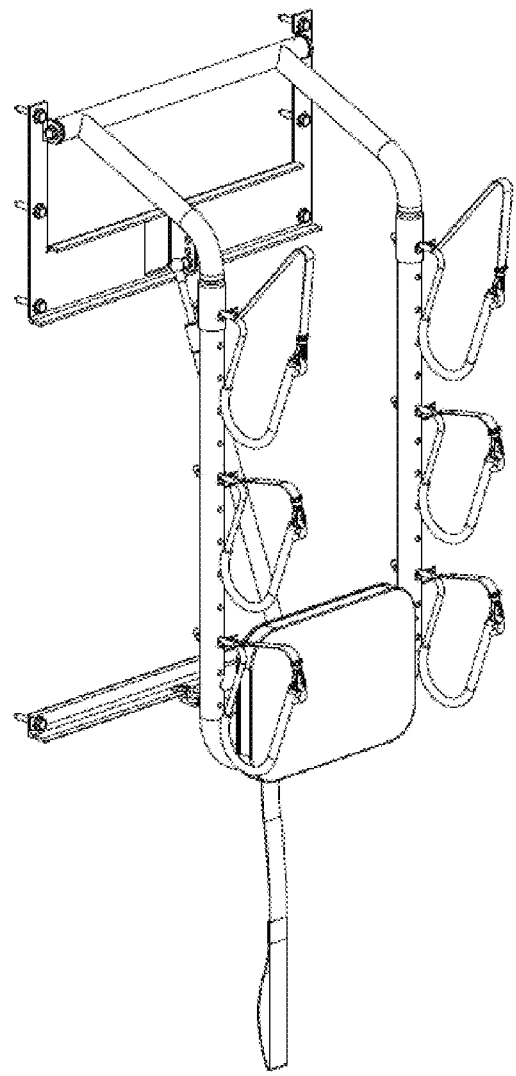
FIG. 14D is a perspective view of another embodiment of the snow accessory kit.
Figure 14E:
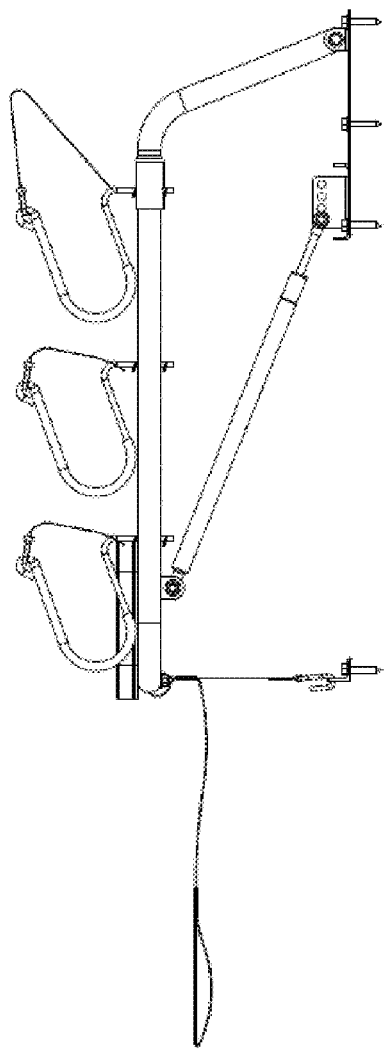
FIG. 14E is a side view of the snow accessory kit of FIG. 14D.
Figure 14F:
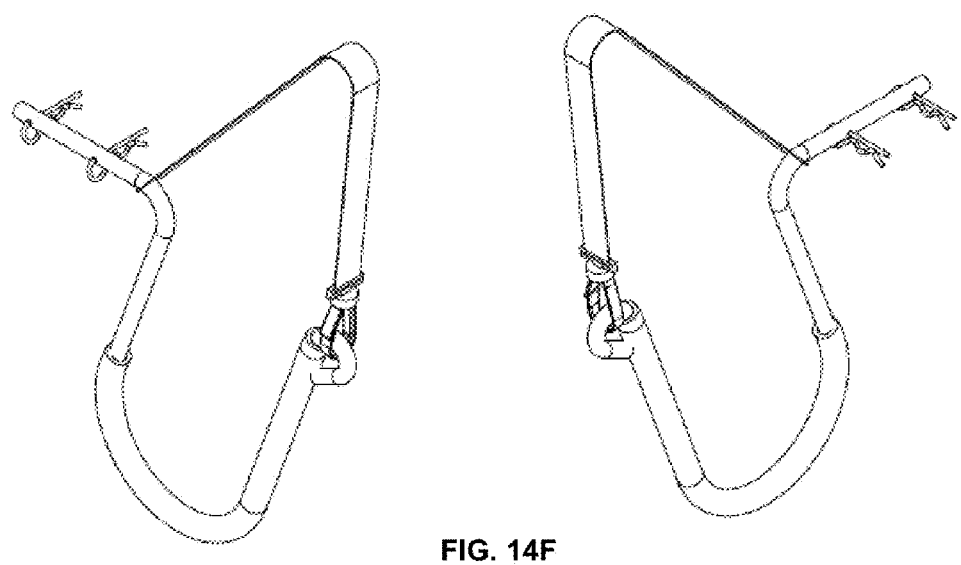
FIG. 14F is a perspective view of the mounting hook shown in FIG. 14D.
Figure 14G:
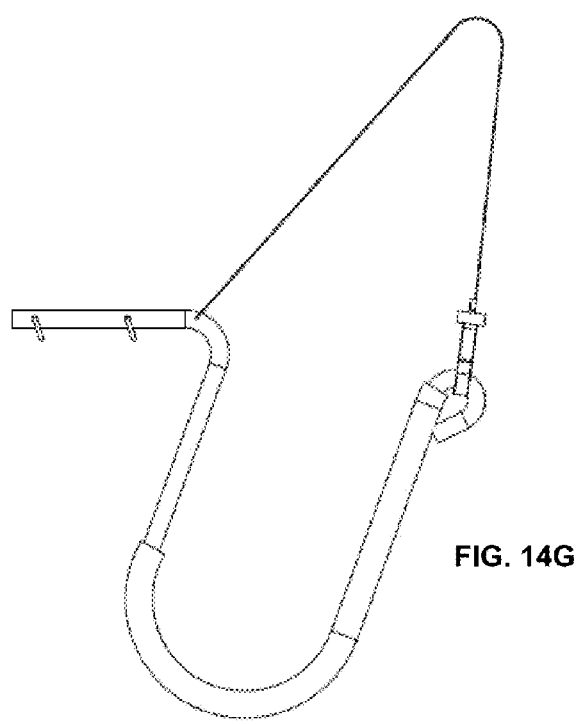
FIG. 14G is a side view of the mounting hook shown in FIG. 14D.

A snow accessory kit 900 is depicted in FIGS. 14A through 14C. FIG. 14A shows several of the snow accessory kits 900 mounted to the storage rack 100. A snowboard, skis, ski poles or other snow sport equipment may be supported by a pair of snow accessory kits 900, and a single kit 900 may hold other items such as helmets. FIG. 14B details the snow accessory kit 900, which is formed of a shaped wire 904 that attaches to the storage rack 100 using cotter pins 912, in a similar fashion to the attachment of the bicycle hooks. A strap 910, which may be elastic, is positioned to wrap over and secure supported snow sports items. As may be seen in FIG. 14C, the wire 914 has a vinyl coating to protect the supported snow sports equipment. FIGS. 14D-G illustrate another embodiment of the snow accessory kit that does not require a pad, wherein each hook is attached to the rack at one position.

FIGS. 16A and 16B show an alternative embodiment of an accessory mount that allows for greater flexibility of positioning attachment supports such as bicycle hooks. A channel 951 is attached to the accessory frame 102, for example, via bolts with nuts through holes 301. A slide assembly 952 is capable of sliding anywhere along the channel 951 to a desired position. As shown in detail in FIG. 16B, the channel 951 has a back wall 956. A threaded bolt 953 attached to a hook 955 is inserted through co-linear holes 957 in the slide assembly 952 to touch back wall 956. A knob 954 on the end of the threaded bolt 953 proximal to the hook 955 is tightened to press the bolt 953 into the back wall 956, thus securing the slide assembly 952 in position.

Figures 17A, 17B, 17C:
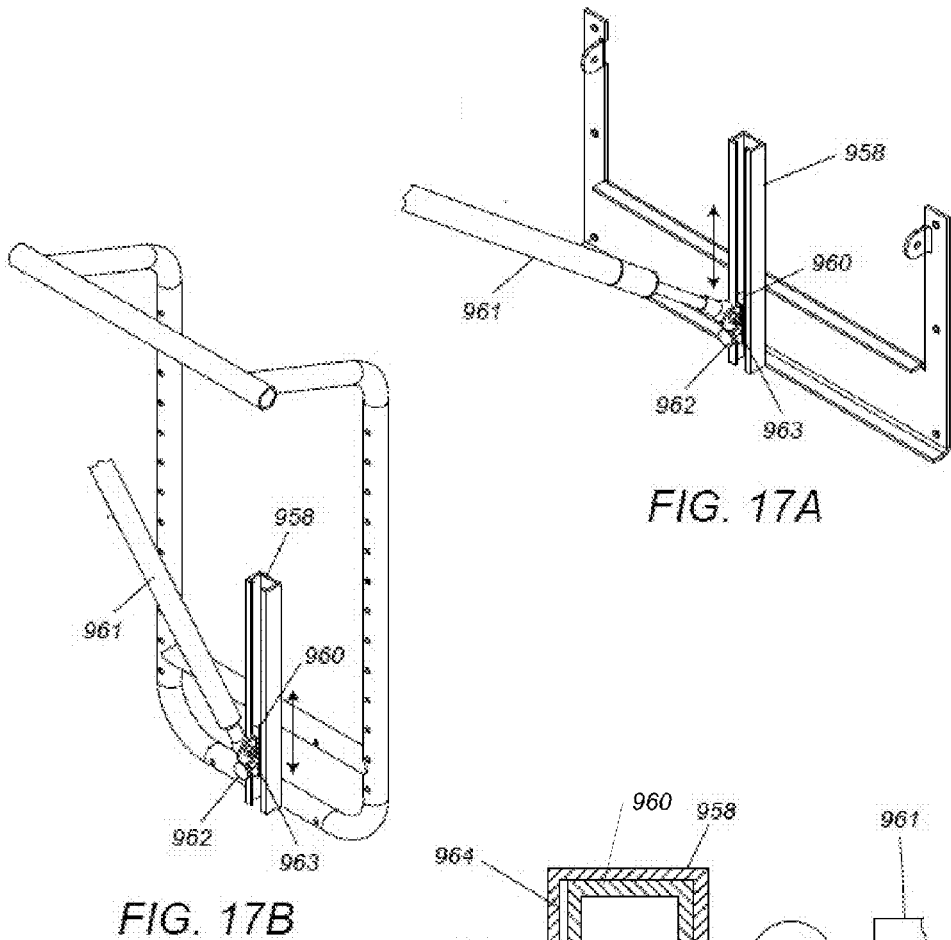
FIG. 17A is a perspective view of the bracket with a channel/slide assembly.
FIG. 17B is a perspective view of the frame with a channel/slide assembly.
FIG. 17C shows detail of the channel/slide assembly of FIGS. 17A and 17B.

A similar type of structure may be used as the connection point for the gas strut, either on the frame and/or on the bracket. So turning to FIG. 5, the wall bracket tab 209 may be replaced with a channel/slide assembly. This is shown in FIG. 17A which illustrates the channel 958 and the slide assembly 960, with the gas strut 961 connected to the slide 960. Similarly, the frame tab 122 (see FIG. 8A) may be replaced with a channel/slide assembly as shown in FIG. 17B. The structure of the channel/slide assembly is shown in FIG. 17C. A slide assembly 960 is capable of sliding anywhere along the channel 958 to a desired position. The channel 958 has a back wall 964. A threaded bolt 966 attached to a knob 962 is inserted through co-linear holes 963, 965 in the slide assembly 960 to touch back wall 964. A knob 962 on the end of the threaded bolt 966 proximal to tightened to press the bolt 966 into the back wall 964, thus securing the slide assembly 960 in position. This allows the user to have more options to fine tune the lifting force of the gas strut, as discussed in more detail below.

To prevent accidental overdeployment of the storage rack 100 toward the ceiling, a stop 921 may be attached to the pivoting frame 301 as seen in FIG. 3. FIG. 15 provides detail of the stop, which is a wire post 931 having a tapered end that fits into a through-hole in the pivoting frame 301 and secures with a cotter pin through hole 934, in the same manner as the bicycle hooks. The distal end of the stop 921 is covered with a cap 933 that can contact the wall or other vertical surface to prevent the accessory frame 103 from deploying beyond the horizontal storage position and potentially pushing the sports equipment into the ceiling, causing damage. Alternatively, the stop could be located on the bicycle hooks, accessory frame or accessory kits.

The storage rack 100 operates as follows to store a bicycle, and similarly for storing other sports equipment. Referring to FIG. 3, when the storage rack 100 is mounted to the wall of a garage, for example, and has a pair of bicycle hooks 107 installed, a user 202 may place the bicycle 502 such that the bicycle top frame is supported on the hooks 107. The hooks 107 may be adjusted up or down to different holes 301 to achieve the ideal placement for any type of bicycle, such as a men's or women's frame, so that the bicycle is generally balanced on the hooks 301 and the handle bar or seat height do not exceed the top height of the storage rack 100. The rubber hook latches 108 may be stretched over the bicycle frame and pulled down onto the hooks 107 to secure the bicycle. Next, the user 202 releases the retainer/pull-down strap 109 by unclipping it from the retainer bar 104. Once released, the gas strut 106 will extend, causing the storage rack 100 to swing in an upward arc in the direction of arrow 204 and moving the bicycle from the vertical loading position to the horizontal, overhead storage position. The stop 921 will engage with the wall if needed to prevent overdeployment. With the bicycle thus stored near the ceiling in typically wasted space, room in the garage is freed for parking a car or other uses.

To retrieve the bicycle from the storage position, the user 202 pulls down on the pull-down loop 414 of the retainer/pull-down strap 109, causing the storage rack 100 to swing in a downward arc in the direction of arrow 204, moving the bicycle from the horizontal storage position to the vertical loading position. The user 202 then secures the retainer/pull-down strap 109 to the retainer bar 104, releases the rubber hook latches 108, and may remove the bicycle 502 from the storage rack 100.

Ideally, the lift force is balanced for the weight of a particular bicycle or other sports equipment, such that the storage rack 100 raises the stored item toward the ceiling and comes to rest in the horizontal storage position without the need to engage the stop, providing an effortless "zero-g" experience for the user. When the correct balance is achieved, the user also expends the least amount of pull-down force required to return the object to the vertical loading position.

The present invention allows for tuning of the lift force to achieve this "zero-g" effect. If the lift force is observed to be too high, i.e., the storage rack 100 swings too forcefully toward the ceiling, engaging the stop, and the user must exert substantial force to pull it down again, then the lift force should be decreased. To do this, with the storage rack 100 unloaded and in the vertical loading position with the accessory frame parallel to the wall, the user may adjust the ends of the gas strut 106 to higher pivotable connections on the wall bracket or on the accessory frame. That is, the user could, for example, relocate the gas strut end 421 from the wall bracket hole 201a to 201c, or the opposite end 422 from the accessory frame hole 123a to 123b. Alternatively, the user could move the bicycle hooks 107 to lower mounting holes 301 on the accessory frame 102.

Conversely, the lift force may be observed to be too low; the storage rack may not deploy fully to the horizontal storage position overhead. In that case, the lift force should be increased. To do this, with the storage rack 100 unloaded and in the vertical loading position with the accessory frame parallel to the wall, the user may adjust the ends of the gas strut 106 to lower pivotable connections on the wall bracket or on the accessory frame. That is, the user could, for example, relocate the gas strut end 421 from the wall bracket hole 201d to 201b, or the opposite end 422 from the accessory frame hole 123b to 123a. Alternatively, the user could move the bicycle hooks 107 to higher mounting holes 301 on the accessory frame 102.

The user may iterate on positioning of the gas strut ends 421, 422 and/or bicycle hooks 107 until the desirable "zero-g" balance is obtained. The tuning process is similar for the other sports equipment kits. The balanced lift force provides an enhanced user experience.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend the following claims "and the embodiments in the specification to be strictly coextensive." *Phillips v. AHW Corp.,* 415 F.3d 1303, 1323 (Fed. Cir. 2005) (en banc).

The invention claimed is:

1. A storage rack comprising:
   a spring device;
   a bracket constructed to be fixed to a vertical surface, the vertical surface defining a plane, the bracket having at least one attachment location that provides a pivotable connection to a first end of the spring device; and
   a frame oriented substantially parallel to the vertical surface, pivotably connected to the bracket and having at least one attachment location that provides a pivotable connection to a second end of the spring device, wherein the frame has at least one mounting location for releasably attaching an at least one object support;
   at least one additional attachment location on the bracket or on the frame that provides an additional pivotable connection to the first end or the second end of the spring device, wherein the at least one additional attachment location is at a height relative to the ground that is higher than the at least one attachment location when the bracket is fixed on the vertical surface and the frame is oriented substantially parallel to the vertical surface;
   wherein the spring device pivotably links the bracket and the frame and is constructed to generate a lift force to deploy the frame and an object supported by the at least one object support to a substantially horizontal storage position, wherein during deployment no part of the frame extends into the plane and the at least one object support is adapted to maintain the supported object in a fixed position relative to the frame, and wherein the lift force may be tuned by adjusting the connection of the spring device between the pivotable connections with the bracket or the frame.

2. The storage rack of claim 1, wherein the frame has more than one mounting location for releasably attaching the at least one object support and the mounting locations are at different heights relative to the ground when the frame is oriented substantially parallel to the vertical surface.

3. The storage rack of claim 1, wherein the spring device is a gas-powered strut.

4. The storage rack of claim 1, wherein the at least one object support comprises at least two hooks constructed to hold a bicycle.

5. The storage rack of claim 4, further comprising a latch attached to each hook constructed to secure the bicycle.

6. The storage rack of claim 1, wherein the at least one object support comprises at least one saddle for holding at least one surfboard or stand-up paddleboard.

7. The storage rack of claim 1, wherein the at least one object support comprises at least two hooks constructed to hold a snowboard or skis.

8. The storage rack of claim 1, further comprising a retainer to secure the frame in an orientation substantially parallel to the vertical surface.

9. The storage rack of claim 8, wherein the retainer comprises a retainer bar mounted to the vertical surface below the bracket, and a retaining strap attached to the frame which releasably secures to the retainer bar.

10. The storage rack of claim 9, wherein the retaining strap further comprises a pull-down strap.

11. The storage rack of claim 1, wherein the lift force is decreased by connecting the spring device at a higher pivotable connection on the bracket or on the frame.

12. The storage rack of claim 1, wherein the lift force is increased by adjusting the spring device to a lower pivotable connection on the bracket or on the frame.

13. The storage rack of claim 2, wherein the lift force is increased by adjusting the at least one object support to a higher mounting location on the frame.

14. The storage rack of claim 2, wherein the lift force is decreased by adjusting the at least one object support to a lower mounting location on the frame.

15. The storage rack of claim 1, further comprising an at least one strap attached to the frame to secure the object supported by the at least one object support.

16. The storage rack of claim 1, wherein the frame further comprises protective padding.

17. The storage rack of claim 1, further comprising a channel attached to the frame and a slide assembly moveable along the channel, wherein the slide assembly is constructed to retain the at least one object support and is fixable at any position along the channel.

18. The storage rack of claim 1, further comprising a channel attached to the frame or bracket, a slide assembly moveable along the channel, wherein the slide assembly comprises the attachment to the spring device, wherein the slide assembly can be fixed at any position along the channel.

19. A method for storing an object, comprising providing a spring device; a bracket constructed to be fixed to a vertical surface, the bracket having at least one attachment location that provides a pivotable connection to a first end of the spring device; and a frame oriented substantially parallel to the vertical surface, the vertical surface defining a plane, pivotably connected to the bracket and having at least one attachment location that provides a pivotable connection to a second end of the spring device, wherein the frame has at least one mounting location for releasably attaching an at least one object support; at least one additional attachment location on the bracket or on the frame that provides an additional pivotable connection to the first end or the second end of the spring device, wherein the at least one additional attachment location is at a height relative to the ground that is higher than the at least one attachment location when the bracket is fixed on the vertical surface and the frame is oriented substantially parallel to the vertical surface; wherein the spring device pivotably links the bracket and the frame and is constructed to generate a lift force;

placing an object onto the at least one object support;

tuning the lift force by adjusting the connection of the spring device between the pivotable connections with the bracket or the frame; and actuating the spring device to deploy the frame and the object supported by the at least one object support to a substantially horizontal storage position, wherein during deployment no part of the frame extends into the plane and the at least one object support maintains the supported object in a fixed position relative to the frame.

\* \* \* \* \*